June 4, 1963   R. D. CHISHOLM   3,092,706
DOMESTIC OVEN WITH OPTIMUM HEAT DISTRIBUTION
Filed Oct. 23, 1961
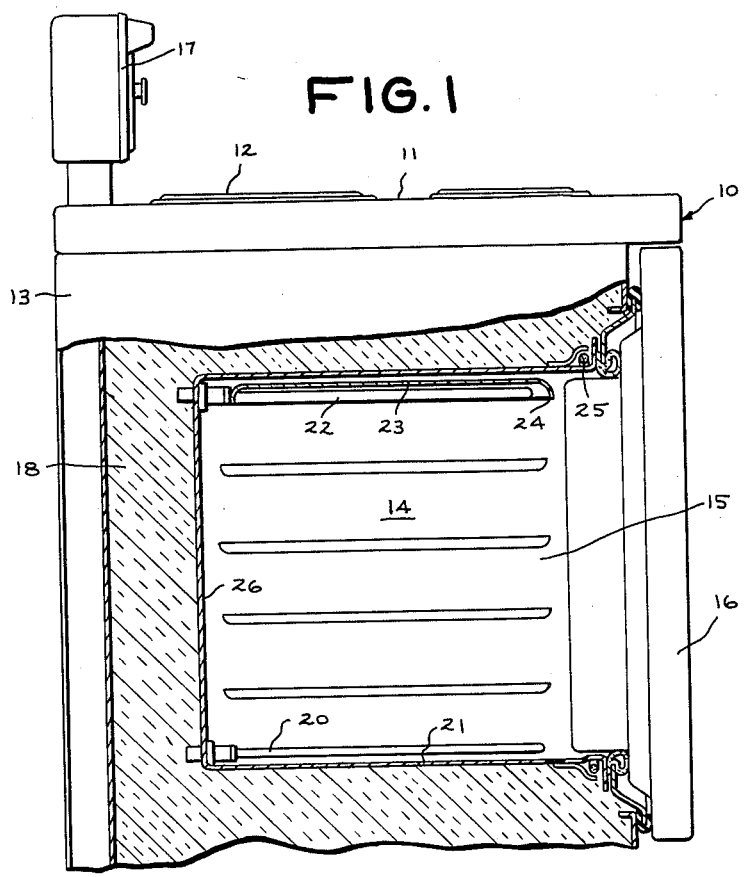
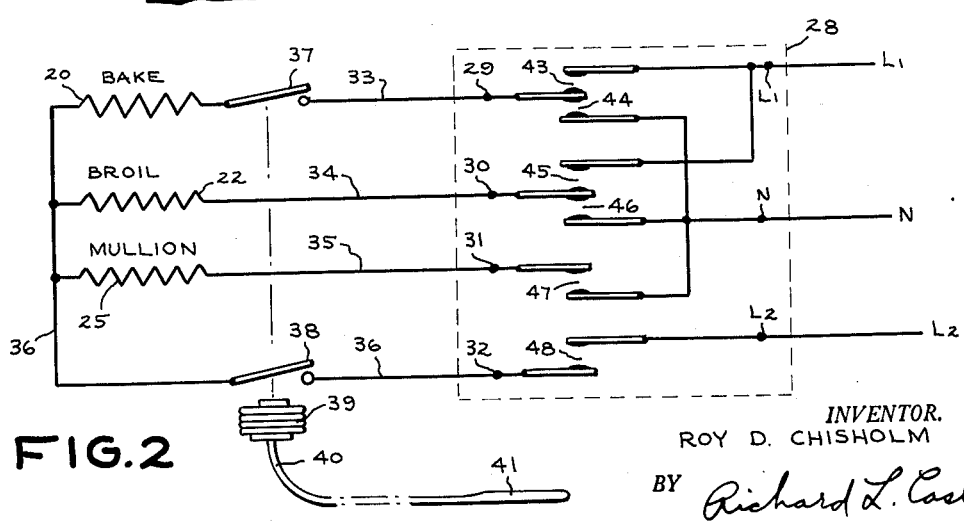
INVENTOR.
ROY D. CHISHOLM
BY Richard L. Caslin
HIS ATTORNEY

United States Patent Office 3,092,706
Patented June 4, 1963

3,092,706
DOMESTIC OVEN WITH OPTIMUM HEAT
DISTRIBUTION
Roy D. Chisholm, Louisville, Ky., assignor to General
Electric Company, a corporation of New York
Filed Oct. 23, 1961, Ser. No. 146,979
6 Claims. (Cl. 219—20)

The present invention relates to domestic ovens and particularly to high temperature electric ovens which are provided with an automatic heat cleaning cycle for burning off the food soil and grease that accumulate on the inner surfaces of the oven liner during normal cooking operations.

In recent years an oven has been designed for domestic use which is capable of both normal cooking operations such as baking and broiling as well as having an automatic heat cleaning cycle where the temperature of the oven air is raised to an amount between 750° F. and 950° F. and held for a sufficient length of time to burn off the food soil and grease that accumulate on the inner surfaces of the oven liner. A suitable range construction for performing this task is disclosed in a copending patent application of Bohdan Hurko, Serial No. 27,926, which was filed on May 9, 1960 and is assigned to the Central Electric Company, assignee of the present invention. In order for such a heat cleaning oven to the able to handle large loads of combustibles, without first causing an excessive amount of smoke and second maintaining a flame in the bottom of the open which might vaporize volatiles more rapidly than is desirable it has been discovered of primary importance to utilize sources of heat that are properly distributed throughout the oven and which represent a low total wattage.

The principal object of the present invention is to provide a domestic oven with an automatic heat cleaning cycle using sources of heat that are properly distributed throughout the oven and have a low applied wattage for handling heavy leads of combustibles to be burned off the inner surfaces of the oven.

A further object of the present invention is to provide a domestic oven with an automatic heat cleaning cycle with a relatively slow heat-up resulting from a low applied wattage so as to prevent excessive generation of smoke.

The present invention, in accordance with one form thereof, embodies an oven cavity defined by a box-like oven liner and an access door. Electric heating elements are used as the source of heat energy for both normal cooking operations and an automatic heat cleaning cycle. The heating elements include a lower bake unit, an upper broil unit and a mullion heater extending around the oven liner adjacent the door for replenishing the heat lost through and around the door. Circuit and control means are used for energizing the various heating elements. During the high temperature heat cleaning cycle all three heating elements are energized so that both the lower bake unit and the upper broil unit are operated at approximately one-fourth rated wattage while the mullion heater is operated at full wattage. This distributes the source of heat energy in the oven so that substantially uniform oven wall temperatures can be obtained with a slightly higher temperature being adjacent the bottom wall of the oven liner but with the wattage supplied in this bottom wall area being less than that necessary to maintain a flame in the bottom of the oven when heavy loads of combustibles must be burned away.

My invention will be better understood from the following description taken in conjunction with the accompanying drawing and its scope will be pointed out in the appended claims FIGURE 1 is a left side elevational view of an electric range with parts broken away to emphasize the design of the oven structure having an automatic heat cleaning cycle according to the present invention; and FIGURE 2 is an energizing circuit diagram for the three heating elements of the oven.

Turning to a consideration of the drawing and in particular to FIGURE 1, there is shown one embodiment of this invention comprising a free-standing electric range 10 having a top cooking surface 11 with a plurality of surface heating elecents 12, a range body 13 for supporting the cooking surface 11 and encompassing an oven cavity 14 formed by a box-like oven liner 15 and a front opening access door 16. A backsplasher 17 is supported along the back edge of the cooking surface 11 and it contains the various controlling components such as switches, thermostat, timers and convenience outlets which are considered necessary elements of a completely equipped range as is well understood in this art. Surrounding the oven liner 15 is a blanket of thermal insulating material 18 such as fiber glass for retaining the heat within the oven and maintaining the outer surfaces of the range body 13 as cool as possible in order to avoid personal discomfort and possible fire hazards.

A large amount of the details of the range are not shown in the drawings because they do not form part of the present invention. One element that is not illustrated is a smoke eliminator which would be mounted in the top wall 23 in the oven liner for acting upon the smoke-filled oven air before it is exhausted into the room. Such a smoke eliminator as the electric catalytic type of the U.S. patent to Stanley B. Welch No. 2,900,483 dated August 18, 1959, which is assigned to the same assignee as is the present invention. The present invention relates to obtaining the optimum heat distribution within the oven cavity with the lowest applied wattage that is practicable during the heat cleaning cycle. The source of heat is divided into three heating elements, namely, a lower bake unit 20 positioned adjacent a bottom wall 21 of the oven liner. Next there is an upper broil unit 22 positioned adjacent a top wall 23 of the oven liner. As in conventional oven designs this upper broil unit is provided with a downturned pan-like reflector 24 which overlies the broil unit and protects the upper wall of the oven liner from excessive heat and directs most of the heat toward the interior of the oven cavity. The third heating element is a mullion heater 25 that is wrapped around the outer surface of the oven liner adjacent the door opening for compensating for heat lost through and around the door so that substantially uniform oven wall temperature can be maintained during the heat cleaning cycle.

All three of the heating elements 20, 22 and 25 are formed as metal sheathed resistance heating elements of the type which have been used in electric ovens for many years. Both the bake unit 20 and the broil unit 22 are fastened to the back wall 26 of the oven liner and an electrical connection is made through the wall for joining these elements in electric energizing circuits. The mullion heater 25 is preferably wrapped around the outside of the oven liner in the shape of a loop where the ends are brought together and connected to a suitable electrical connector. Of course a modification would be to assemble the mullion heater within the oven liner and perhaps hide it from view with a suitable trim member as would be well understood in this art. For further details of specific features of a heat cleaning oven reference may be made to the aforementioned copending application of Bohdan Hurko which is the basic application on an automatic heat cleaning oven design.

In the preferred embodiment, the three heating elements are energized in a manner which will best be understood by studying the circuit diagram of FIGURE 2 wherein the heating elements are identified as elements 20, 22 and 25. An oven selector switch 28 is shown disposed between the source of power and the heating elements. Power is supplied through a three-wire, single phase, 230 volt alternating current source which is represented by the three lead wires identified as lines L1 and L2 and neutral wire N. Thus, the switch has three line terminals L1, N and L2. Similarly, the switch has four load terminals identified as 29, 30, 31 and 32. The bake unit 20 is connected to switch terminal 29 by lead 33, the broil unit 22 is connected to switch terminal 30 by lead 34, and the mullion heater 25 is connected to switch terminal 31 by lead 35. All three heating elements 20, 22 and 25 are connected by a common lead 36 to the switch terminal 32. Both leads 33 and 36 are broken by thermostat contacts 37 and 38, respectively, of a thermostat 39 which is shown diagrammatically in the circuit diagram as a bellows having a capillary tube 40 and a thermostatic bulb 41 which is adapted to be positioned within the oven cavity for sensing the oven temperature and signaling the temperature to the thermostat for proper control thereof. The oven selector switch 28 has a series of contacts which are identified by the reference numerals 43—48.

Both the bake and broil units 20 and 22 may have the same rated wattage, namely 3000 watts although this is not a critical requirement. During a baking operation the bake unit 20 is operated at rated wattage across L1 and L2 at 236 volts while at the same time the broil unit 22 is operated at one-fourth rated wattage across line L2 and neutral N at 118 volts. During the baking operation the following circuits are energized: the bake unit 20 is operated at rated wattage across L1 and L2 at a potential of 236 volts from line L1, through switch contacts 43, switch terminal 29, lead 33, closed thermostat contacts 37, bake unit 20, lead 36, through closed thermostat contacts 38, to switch terminal 32, switch contacts 48 and line L2. At the same time the broil unit 22 is in a circuit at one-fourth wattage across L2 and N at 118 volts from neutral wire N through switch contacts 46, switch terminal 30, lead 34, broil unit 22, lead 36 through thermostat contacts 38 to switch terminal 32, switch contacts 48 and line L2.

During a broiling operation only the broil unit 22 is energized and it is operated at rated wattage, for example 3000 watts, across lines L1 and L2 at 236 volts. The circuit for the broil unit is from line L1 through switch contacts 45, switch terminal 30, lead 34, broil unit 22, lead 36, closed thermostat contacts 38, switch terminal 32, switch contacts 48 and line L2.

Finally, we come to the heat cleaning circuit where all three heating elements, the bake unit 20, broil unit 22 and mullion heater 25, are connected in parallel across neutral wire N and line L2 at 118 volts. Understandably, one of the heating elements could be connected across line L1 and the neutral wire N instead of the parallel connection of all three elements. Both the bake and broil units 20 and 22 are operated at one-fourth their rated wattage or 750 watts, while the mullion heater in operated at rated wattage, namely, 500 watts for a total of 2000 watts of energy during the heat cleaning cycle. All three heating elements 20, 22 and 25 are connected to the neutral wire N, i.e., by closing switch contacts 44, 46 and 47, while the same heating elements are connected to line L2 by closing switch contacts 48. Said in another way, the circuit from neutral wire N is through switch contacts 44, switch terminal 29, lead 33, closed thermostat contacts 37, bake unit 20, lead 36, closed thermostat contacts 38, switch terminal 32, switch contacts 48 and line L2. Similarly, the broil unit 22 is energized from neutral wire N, through switch contacts 46, switch terminal 30, lead 34, broil unit 22, lead 36, closed thermostat contacts 38, switch terminal 32, switch contacts 48 and line L2. Lastly, the mullion heater 25 is fed from neutral wire N through switch contacts 47, switch terminal 31, lead 35, mullion heater 25, lead 36, closed thermostat contacts 38, switch terminal 32, switch contacts 48 and line L2.

Having described above my invention of an energizing circuit arrangement for optimum heat distribution in a heat cleaning oven it will readily be apparent to those skilled in this art that this invention results in the ability to clean more completely larger loads of food soil because of the slow heat-up resulting from a low applied wattage that boils volatiles more slowly to prevent overloading the smoke eliminator at too small a soil load. Also, there is a uniform temperature distribution with a slightly higher temperature at the bottom where most of the soil collects thereby giving uniform cleaning. Keeping the heat sources away from the bottom as much as possible prevents maintaining a flame in the bottom of the oven which would vaporize volatiles more rapidly than is desirable. The specific wattages given above are mainly for purposes of illustration because wattages will vary from one manufacturer to the next as a function of the oven size and the features of the design of the oven. The total wattage of about 2000 watts is quite close to a critical wattage although it too may be varied between narrow limits. This wattage is actually more than is necessary for raising the oven air temperature to the heat cleaning range, but this extra power is deemed necessary to allow for manufacturing tolerances and line voltage variations. Another oven design might have a 3000 watt broil unit, a 1400 watt bake unit, and a 300 watt mullion heater. These heating units could be connected in a circuit that energizes the broil unit at one-fourth rated wattage or 750 watts, the bake unit at about one-half rated wattage or 650 watts, and the mullion heater at rated wattage of 300 watts. Notice the bake and broil unit wattages are substantially equal and the mullion heater wattage is about one-half the wattage of either the bake or broil unit. Of course, with an oven door with less of a sealing action, the mullion heater wattage would have to be increased so that the actual wattage would be much larger than one-half although the effective wattage will remain at about one-half of the wattages of the bake and broil units.

Modifications of this invention will occur to those skilled in this art and it is to be understood, therefore, that this invention is not limited to the particular embodiments disclosed, but that it is intended to cover all modifications which are within the true spirit and scope of this invention as claimed.

What I claim as new and desire to secure by Letters Patent of the United States is:

1. A high temperature domestic oven having an oven cavity formed by a box-like oven liner and an access door, the oven liner including at least three heating elements, a lower bake unit, an upper broil unit and a mullion heater wrapped around the oven liner adjacent the access door, a source of voltage, electric circuit control means for energizing the heater elements for normal cooking operations as well as for a high temperature heat cleaning cycle, the control means controlling the energization of said heating elements so that the three heating elements are energized during a high temperature cycle such that both the upper broil unit and the lower bake unit are energized at approximately one-fourth rated wattage, while the mullion heater is energized at rated wattage so as to maintain the oven at a sufficiently uniform temperature while distributing much of the source of heat energy away from the bottom wall of the oven so as to prevent fires and excessive smoking conditions.

2. A high temperature domestic oven as recited in claim 1 wherein the total wattage used during the high temperature cycle is approximately 2000 watts which is only slightly above heat losses from oven to allow for proper operation when the supply line voltages vary in a direction to give minimum wattage.

3. A high temperature domestic oven as recited in claim 1 wherein during the high temperature cycle the lower bake unit is operated at approximately 750 watts, the upper broil unit is operated at approximately 750 watts, and the mullion heater is operated at approximately 500 watts.

4. A high temperature domestic oven as recited in claim 1 wherein during the high temperature cycle the three heating elements are connected in a circuit cross approximately one-half the maximum available voltage supplied to the oven.

5. A high temperature domestic oven having an oven cavity formed by a box-like oven liner and an access door, the oven liner including at least three heating elements, a bake unit resting on the bottom wall of the oven liner, a broil unit positioned beneath the top wall of the oven liner and a mullion heater wrapped around the outside of the oven liner adjacent the access door, electric circuit control means for energizing the heating element such that for broiling operations the upper broil unit is operated at rated wattage, during baking operations the lower bake unit is operated at rated wattage while the upper broil unit is operated at about one-fourth rated wattage, and during a high temperature heat cleaning cycle all three heating elements are energized, the upper broil unit and the lower bake unit being energized at reduced wattages which are approximately equal, while the mullion heater is energized at rated wattage for a total wattage of about 2000 watts so as to maintain the oven at sufficiently uniform temperatures by distributing much of the source of heat energy away from the bottom wall of the oven and prevent fires and excessive smoking conditions.

6. A high temperature domestic oven as recited in claim 5 wherein during the heat cleaning cycle both the upper broil unit and the lower bake unit are energized at approximately one-fourth rated wattage.

References Cited in the file of this patent

UNITED STATES PATENTS

| | | |
|---|---|---|
| 2,224,945 | Ames | Dec. 17, 1940 |
| 2,247,626 | Ames | July 1, 1941 |
| 2,300,837 | Ames | Nov. 3, 1942 |
| 2,617,008 | Ames | Nov. 4, 1952 |